(12) United States Patent
Grass et al.

(10) Patent No.: US 9,249,763 B2
(45) Date of Patent: Feb. 2, 2016

(54) HOLLOW PLASTIC PIECE

(75) Inventors: Uwe Grass, Stuttgart (DE); Sven Alexander Kaiser, Winnenden (DE)

(73) Assignee: Mahle International GmbH (DE)

( * ) Notice: Subject to any disclaimer, the term of this patent is extended or adjusted under 35 U.S.C. 154(b) by 326 days.

(21) Appl. No.: 13/820,503

(22) PCT Filed: Aug. 22, 2011

(86) PCT No.: PCT/EP2011/064341
§ 371 (c)(1),
(2), (4) Date: May 13, 2013

(87) PCT Pub. No.: WO2012/028481
PCT Pub. Date: Mar. 8, 2012

(65) Prior Publication Data
US 2013/0228147 A1    Sep. 5, 2013

(30) Foreign Application Priority Data

Sep. 2, 2010 (DE) .......................... 10 2010 040 172

(51) Int. Cl.
*F02M 35/10* (2006.01)
*B29C 65/00* (2006.01)
(Continued)

(52) U.S. Cl.
CPC .......... *F02M 35/10137* (2013.01); *B29C 65/02* (2013.01); *B29C 65/4815* (2013.01); *B29C 65/5057* (2013.01); *B29C 65/5071* (2013.01); *B29C 65/5085* (2013.01); *B29C 65/562* (2013.01); *B29C 65/564* (2013.01); *B29C 66/1312* (2013.01); *B29C 66/30321* (2013.01);
(Continued)

(58) Field of Classification Search
CPC ............ F02M 35/10; F02M 35/10321; F02M 35/1034; F02M 35/10354; F02M 35/1036; F25D 29/00; B29C 45/14; B29C 65/14; B29C 65/00; B29C 49/02; B29C 2049/021
USPC ........................................ 123/184.21, 184.61
See application file for complete search history.

(56) References Cited

U.S. PATENT DOCUMENTS 3,284,257 A    11/1966  Soloff et al.
4,931,214 A    6/1990   Worrell et al.
(Continued)

FOREIGN PATENT DOCUMENTS

DE    2509725 A1    9/1976
DE    19915819 A1   10/2000
(Continued)

OTHER PUBLICATIONS

Definition for "clip", obtained from http://dictionary.reference.com/browse/clip, Mar. 21, 2015.*
(Continued)

*Primary Examiner* — Lindsay Low
*Assistant Examiner* — Grant Moubry
(74) *Attorney, Agent, or Firm* — Fishman Stewart Yamaguchi PLLC

(57) ABSTRACT

A hollow plastic part may include at least two plastic shells connected with one another at a respective edge along at least one joining plane. Each plastic shell may have at least a first component and a second component, wherein the plastic of the first component may have a lower melting temperature than the plastic of the second component. The first component may extend on at least one plastic shell in a caterpillar-like manner along at least part of the respective edge of the second component of this plastic shell.

19 Claims, 2 Drawing Sheets

(51) Int. Cl.
  *B29C 65/02* (2006.01)
  *B29C 65/50* (2006.01)
  *B29C 65/56* (2006.01)
  *B29C 65/48* (2006.01)
  *B29L 31/30* (2006.01)
  *B29L 31/00* (2006.01)

(52) U.S. Cl.
  CPC ........... *B29C 66/30325* (2013.01); *B29C 66/54* (2013.01); *B29C 66/73116* (2013.01); *B29C 66/91411* (2013.01); *B29C 66/91931* (2013.01); *B29C 66/91935* (2013.01); *F02M 35/1036* (2013.01); *F02M 35/10144* (2013.01); *F02M 35/10321* (2013.01); *B29C 66/003* (2013.01); *B29C 66/8322* (2013.01); *B29L 2031/3055* (2013.01); *B29L 2031/749* (2013.01); *B29L 2031/7492* (2013.01)

(56) References Cited

U.S. PATENT DOCUMENTS

| | | | | |
|---|---|---|---|---|
| 5,670,108 | A * | 9/1997 | Kern et al. | 264/248 |
| 5,947,073 | A * | 9/1999 | Chaffin et al. | 123/184.61 |
| 5,951,929 | A * | 9/1999 | Wilson | 264/139 |
| 6,267,093 | B1 * | 7/2001 | Lohr | 123/184.61 |
| 6,581,560 | B1 * | 6/2003 | Mammarella | 123/184.31 |
| 6,964,717 | B2 * | 11/2005 | Grosser | B29C 65/58 156/272.8 |
| 7,207,307 | B2 * | 4/2007 | Ino et al. | 123/184.21 |
| 7,213,560 | B2 * | 5/2007 | Jones et al. | 123/184.61 |
| 7,475,664 | B2 * | 1/2009 | Jones et al. | 123/184.21 |
| 7,981,343 | B2 * | 7/2011 | Feichtenschlager et al. | 264/248 |
| 2005/0005890 | A1 * | 1/2005 | Asfaw et al. | 123/184.61 |
| 2010/0192891 | A1 | 8/2010 | Catton et al. | |

FOREIGN PATENT DOCUMENTS

| | | |
|---|---|---|
| DE | 10216175 C1 | 7/2003 |
| EP | 0177061 A2 | 4/1986 |
| EP | 0177062 A2 | 4/1986 |
| EP | 1573195 A1 | 9/2005 |
| JP | H0596623 A | 4/1993 |
| WO | WO-2005017429 A1 | 2/2005 |

OTHER PUBLICATIONS

English abstract for DE-19915819.
English abstract for DE-10216175.
International Search Report for PCT/EP2011/064341.
English Abstract for JP H0596623.
EP Office Action for Application No. 11746546.8, dated Feb. 10, 2015, 6 pp.

* cited by examiner

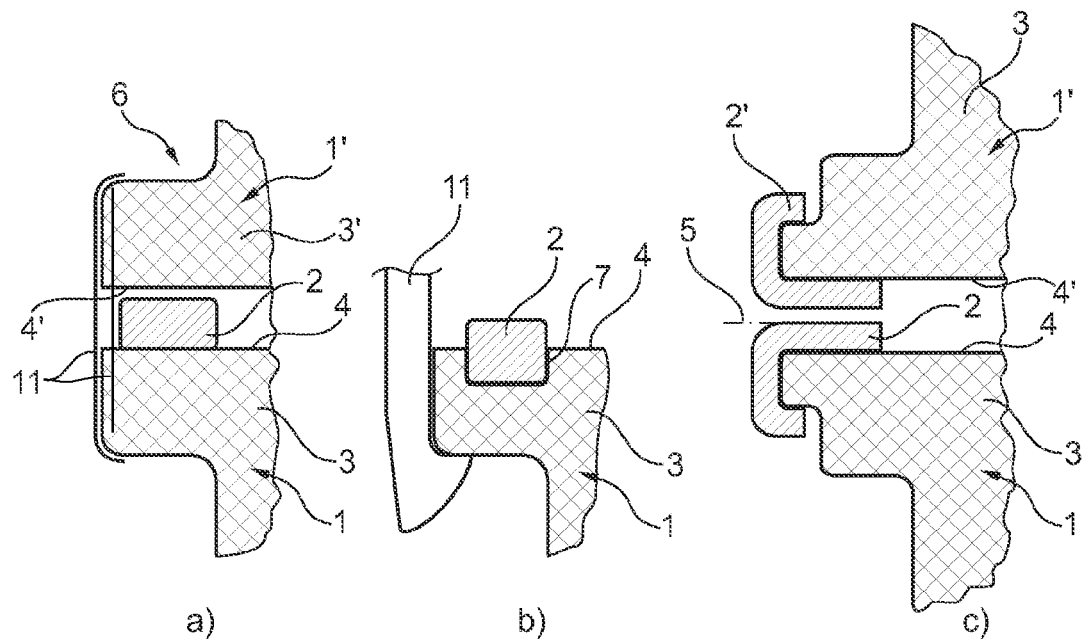
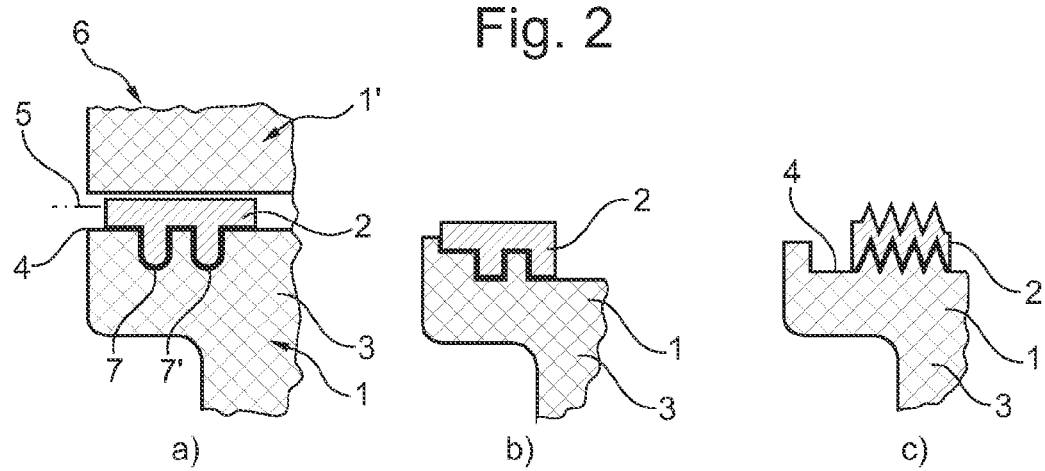
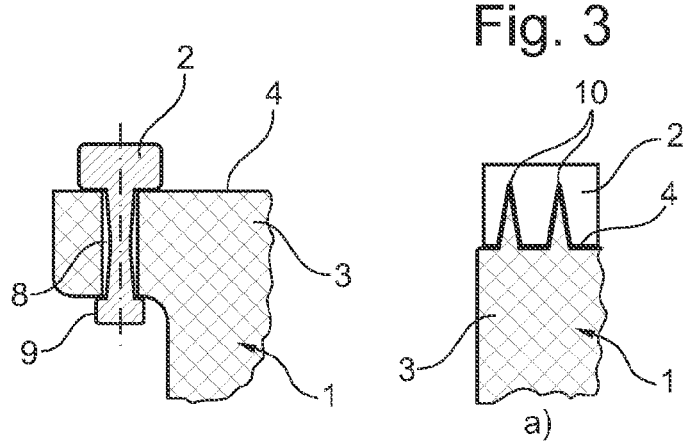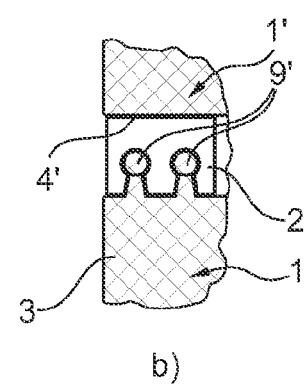
Fig. 2
Fig. 3
Fig. 4　　Fig. 5

HOLLOW PLASTIC PIECE

CROSS-REFERENCE TO RELATED APPLICATION

This application claims priority to German Patent Application 10 2010 040 172.2 filed on Sep. 2, 2010, and International Patent Application PCT/EP2011/064341, filed on Aug. 22, 2011, both of which are hereby incorporated by reference in their entirety.

TECHNICAL FIELD

The present invention relates to a hollow plastic part, which is composed of at least two plastic shells, according to the introductory clause of claim 1. The invention also relates to at least one plastic shell for such a hollow plastic part.

BACKGROUND

A generic hollow plastic part is known from EP 1 573 195 B1, which is composed of two plastic shells. These two plastic shells are welded together over a respective edge along a joining plane to produce the hollow plastic part, wherein each of the plastic shells has at least a first and a second component. The first component is constructed here in the form of a half pipe, whilst the second component forms a part of a bellows.

Further hollow plastic parts are known for example from EP 1 777 061 A2 and from EP 1 777 062 A2.

SUMMARY

The present invention is concerned with the problem of indicating an improved or at least an alternative embodiment for a hollow plastic part of the generic type, which is distinguished in particular by low production costs.

This problem is solved according to the invention by the subject matter of the independent claims. Advantageous embodiments are the subject matter of the dependent claims.

The invention is based on the general idea, in a hollow plastic part which is usually composed of two plastic (half) shells, to construct the two plastic shells such that the latter, despite different plastic components, can be reliably welded together with only one predefined welding temperature. The two plastic shells are welded together here over a respective edge along at least one joining plane, wherein—as mentioned—each of the plastic shells has at least a first and a second component. These at least two components are formed here from different plastics, wherein the plastic of the first component has a lower melting temperature than the plastic of the second component. According to the invention, the first component with the lower melting temperature now extends on at least one plastic shell in a caterpillar-like manner along at least part of the edge of the joining plane of the second component of this plastic shell. To weld the two plastic shells together, now only at least one of the two plastic shells must be heated at the edge to the melting temperature of the first component and then pressed with the second plastic shell. The heating of at least one, preferably both, of the plastic shells at the edge of the joining plane to the melting temperature of the first component causes the first component, extending in a caterpillar-like manner along the edge of the joining plane of the second component in the manner of an adhesive/welding bead to become heated and thereby to melt, whereby a tight and secure connection can be achieved with the associated other plastic shell by a pressing and subsequent cooling. In contrast to hollow plastic parts known hitherto, in which the two plastic shells had to be heated with different intensity at different regions owing to their respective component-dependent melting temperatures, this can be omitted in the plastic shells according to the invention, so that the latter, for welding, only have to be heated along the edge of the joining plane to the melting temperature of the first component, in order to thereby be able to be welded together tightly and securely. As the melting temperature of the first component lies below the melting temperature of the second component, the welding of the two plastic shells can take place with a comparatively low temperature, i.e. the melting temperature of the first component, so that negative temperature influences onto the second component can be reliably ruled out. Compared with plastic shells known hitherto, which had to be heated with different intensity for welding, in the plastic shells according to the invention a burning of the first component in the transition region between it and the second component can also be avoided, because the entire edge of the plastic shell which is to be joined is only heated to the melting temperature of the first component. A heating of the second component to its higher melting temperature is not necessary in the hollow plastic part according to the invention for the reliable welding together of the two plastic shells. Hereby, in particular, the assembly of the two plastic shells, i.e. the manufacturing process of the hollow plastic part, can be realized more simply and hence at a more favourable cost.

In an advantageous further development of the solution according to the invention, the hollow plastic part is constructed as an air intake manifold, in particular in an intake tract of an internal combustion engine. Of course, the hollow plastic part can have almost all cross-sectional shapes, diameters or geometric shapes here, wherein the hollow plastic part according to the invention is of great advantage in particular for the production of air intake manifolds in internal combustion engines.

In an advantageous further development of the solution according to the invention, at least one edge of the joining plane has a sawtooth contour, whereby a greater connecting surface is created and thereby the tight connection of the two plastic shells with one another can be configured in an even more reliable manner. The first component, extending according to the invention along the edge of the joining plane, can be provided here only on one plastic shell or else on both plastic shells, whereas the sawtooth contour likewise can be arranged on only one or on both plastic shells. Of course, the increased surface can also be achieved by other geometries, such as for example grooves, needles, spurs, ridges or through-openings, wherein in particular rounded corner regions are provided in the case of the grooves, in order to prevent an inclusion of air bubbles. Such an inclusion of air prevents or reduces at least an adhesion, whereby the connection is weakened at this point and the tightness of the two plastic shells can be impaired. In the case of the through-openings, provision can be made that during welding of the two plastic shells the first component of the two plastic shells deforms through the at least one through-opening and solidifies therein, or else through a corresponding tool a part of the first component, emerging on the side of the edge which faces away, deforms in a plastic manner and thereby a head is formed, which likewise ensures a reliable connection of the two plastic shells with one another. The provision of at least one ridge, a needle and/or a pin has the great advantage that a free end of this ridge/pin or respectively the needle during welding of the two plastic shells heats up so intensively owing to its small geometric dimensions that it deforms in a plastic manner and forms a head which is surrounded by the caterpillar-like first component. Hereby, likewise, a particularly reliable connection, acting in the manner of an undercut, can be created between the first component and the edge of the second component.

Further important features and advantages of the invention will emerge from the subclaims, from the drawings and from the associated description of the figures with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically

DETAILED DESCRIPTION

Figure 1:
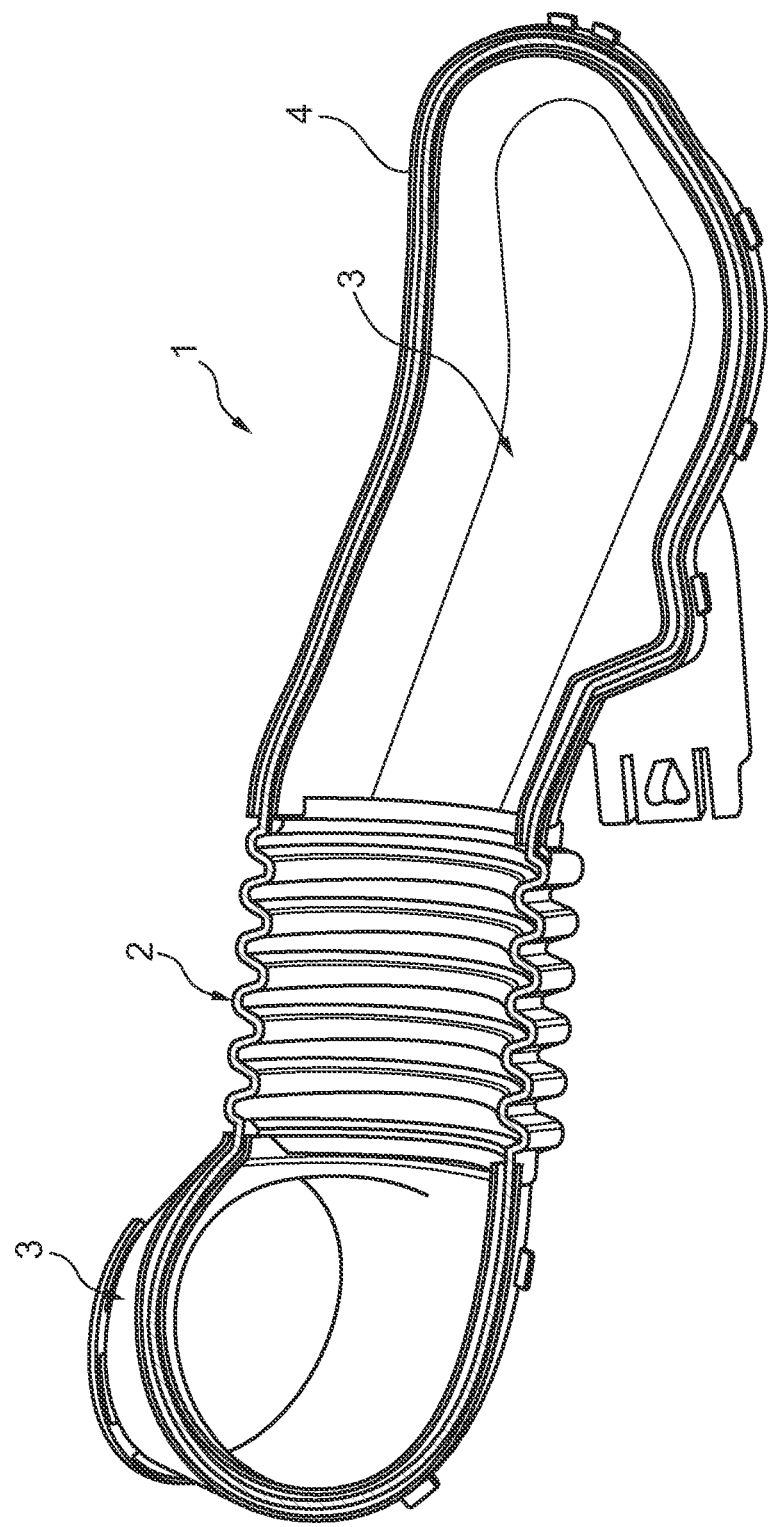
FIG. 1 a plastic shell according to the invention, which is able to be assembled together with a further plastic shell, not shown, to a hollow plastic part, in particular an air intake manifold, FIG. 2a to c a sectional illustration through an edge of a joining plane of the plastic shell with differently constructed geometries, FIG. 3a to c a similar illustration as in FIG. 2, but with different contours, FIG. 4 an edge of the joining plane with a through-opening, FIG. 5a a ridge-like contour at the edge of the joining plane before melting, FIG. 5b an illustration as in FIG. 5a, but after the connecting of the two plastic shells.

According to FIG. 1, a plastic shell 1 according to the invention, which can be constructed for example as part of an air intake manifold for an intake tract of an internal combustion engine, has at least a first component 2 and a second component 3 connected, in particular welded, therewith. According to the illustration in FIG. 1, the plastic shell 1 according to the invention has two second components 3, between which the first component 2 is arranged in the form of a bellows. The two components 2 and 3 are formed here from different plastics, wherein the plastic of the first component 2 has a lower melting temperature than the plastic of the second component 3. When one observes FIG. 1 more closely, it can be seen that the first component 2 with the lower melting temperature extends in the manner of a caterpillar along an edge 4 of a joining plane 5 (cf. also FIGS. 2 and 3) of the second components 3 of the plastic shell 1. At least two of these plastics shells 1, 1', which can be constructed for example as identical parts, produce in the finished state, when welded together, an air intake manifold of an internal combustion engine, mentioned in the introduction, wherein the first component 2 constitutes a flexible region of this air intake manifold. Through the first component 2, extending according to the invention along the edge 4 of the second component 3, which first component has a lower melting temperature compared with the second component 3, a welding together of the at least two plastic shells 1, 1' to a finished hollow plastic part 6 (cf. FIGS. 2 and 3) is conceivably simple, because for welding, the plastic shells 1, 1' at their edge 4, 4' only have to be heated to the melting temperature of the plastic of the first component 2, in order to be able to produce a reliable and tight welded connection.

Hitherto, the individual components 2, 3 had to be heated respectively to their individual melting temperature, which was able to lead in particular in the transition region between the two components 2, 3 to either an unsatisfactory melting of the second component 3 or to a burning of the first component 2. This is to be prevented by the hollow plastic part 6 or respectively the plastic shells 1, 1' constructed according to the invention.

If one observes FIG. 2a, it can be seen that the first component 2 extending along the edge 4 of the plastic shell 1 in a caterpillar-like manner rests substantially flat on the edge 4 of the first plastic shell, whereas according to FIG. 2b on the edge 4 of the plastic shell 1 in addition a groove 7 is provided, which at least partially receives the first component 2. The corner regions of the groove 7 are constructed here so as to be preferably at least slightly rounded, in order to be able to reliably rule out in particular the inclusion of air bubbles impairing the tightness.

In the embodiment according to FIG. 2c, the first component 2, extending in a caterpillar-like manner along the edge 4 of the joining plane 5, surrounds the edge 4 of the associated second component 3 and thereby ensures the good and tight connection of the two plastic shells 1 and 1'. The first component 2 may be arranged here only on one of the two plastic shells 1, 1' or else on both plastic shells, as is shown by way of example in FIG. 2c by a first component 2'. The shape of the first components 2, 2' shown according to FIG. 2 can of course also have here the shape of the first components 2 shown in the other figures.

Of course, the edge 4 of the plastic shell 1 and/or also the edge 4' of the plastic shell 1' can have not only one groove 7, but for example several grooves 7, 7', as is shown for example according to FIGS. 3a and 3b, or else a sawtooth structure (cf. FIG. 3c), wherein all such contours increase a connecting surface between the edge 4 of the second component 3 and of the first component 2.

It is also conceivable that the edge 4 has at least one through-opening 8 at the joining plane 5 of the second component 3, as is shown for example according to FIG. 4, so that the first component 2 deforms through the at least one through-opening 8 and can solidify therein on welding of the two plastic shells 1 and V. It is also conceivable that with a corresponding tool, which is not shown, on an opposite side of the edge 4 a head 9 is formed onto the solidifying first component 2, whereby a particularly good connection of the first component 2 with the second component 3 can be achieved.

It is likewise conceivable that on at least one edge 4, 4' of the second component 3, ridges 10, needles and/or pins are arranged, as are shown for example according to FIGS. 5a and 5b, wherein a free end of the at least one ridge 10, pin on welding of the two plastic shells 1 and 1' is heated so intensively that this free end deforms in a plastic manner and forms a head 9', which is surrounded by the caterpillar-like first component 2 during welding and is fixed therewith. Of course, the two plastic shells 1 and 1' forming the hollow plastic part 6 can be fixed to one another additionally by a fastening element 11 (cf. FIGS. 2a and 2b), for example by a clamp, a clip connection or a screw.

With the plastic shell 1 according to the invention, it is thereby possible to distinctly simplify the welding of at least two of these plastic shells 1 and 1' to a hollow plastic part 6, for example an air intake manifold, because the plastic shell 1 must only be heated on the edge 4 uniformly to the melting temperature of the first component 2 for welding. In particular, through the plastic shell 1, 1' according to the invention a burning of the first component 2 by too intensive heating and hence the producing of a merely untight connection of the two plastic shells 1 and 1' can be reliably prevented.

The invention claimed is:

1. A hollow plastic part, comprising: at least two plastic shells,
wherein the plastic shells are connected with one another at a respective edge along at least one joining plane,
wherein each plastic shell has at least a first component and a second component,
the two components are formed from different plastics, wherein a plastic of the first component has a lower melting temperature than a plastic of the second component,
wherein the first component with the lower melting temperature extends on at least one plastic shell in a caterpillar-like manner along at least part of the respective edge of the second component of this plastic shell, and
wherein a melting temperature of the first component is approximately 240-260° C. and a melting temperature of the second component is approximately 280° C.

2. The hollow plastic part according to claim 1, wherein the plastic hollow part is constructed as an air intake manifold for an internal combustion engine.

3. The hollow plastic part according to claim 1, wherein the first component is constructed as part of a bellows and the second component is constructed in a form of a half pipe.

4. The hollow plastic part according to claim 1, wherein the at least one respective edge has at least one of a groove, a ridge, a pin, a needle, a sawtooth contour and a through-opening.

5. The hollow plastic part according to claim 4, wherein the at least one respective edge has at least one groove having rounded corner regions.

6. The hollow plastic part according to claim 1, wherein the first component extends in the caterpillar-like manner along at least part of the respective edge of the joining plane and surrounds the respective edge of the associated second component.

7. The hollow plastic part according to claim 1, wherein the at least one respective edge has a ridge having a free end configured to deform during welding of the two plastic shells and form a head configured to be surrounded by the caterpillar-like first component.

8. The hollow plastic part according to claim 1, wherein the at least one respective edge has a through-opening and further wherein the first component is configured to deform through the at least one through-opening and solidify therein during welding of the two plastic shells.

9. The hollow plastic part according to claim 1, wherein the two plastic shells are constructed as identical parts.

10. The hollow plastic part according to claim 1, further comprising at least one fastening element configured to fix the two plastic shells to one another.

11. The hollow plastic part according to claim 10, wherein the fastening element is at least one of a clip element and a screw.

12. A plastic shell for a hollow plastic part, the plastic shell comprising:
at least a first component and a second component,
wherein the two components are formed from different plastics and a plastic of the first component has a lower melting temperature than a plastic of the second component,
wherein the first component with the lower melting temperature extends in a caterpillar-like manner along at least part of an edge of the associated second component, and
wherein the edge has a ridge having a free end configured to deform during welding of the two plastic shells and form a head configured to be surrounded by the caterpillar-like first component.

13. The plastic shell according to claim 12, wherein the first component is constructed as part of a bellows and the second component is constructed in the form of a half pipe.

14. The plastic shell according to claim 12, wherein the edge has at least one groove having rounded corner regions.

15. The plastic shell according to claim 12, wherein the first component extends in the caterpillar-like manner along at least part of the edge and surrounds the edge of the associated second component.

16. The plastic shell according to claim 12, wherein the melting temperature of the first component is approximately 240-260° C. and the melting temperature of the second component is approximately 280° C.

17. The plastic shell according to claim 12, wherein the edge has at least one through-opening and further wherein the first component is configured to deform through the at least one through-opening and solidify therein during welding of the two plastic shells.

18. The plastic shell according to claim 12, further comprising at least one fastening element configured to fix the two plastic shells to one another.

19. A hollow plastic part, comprising: at least two plastic shells,
wherein the plastic shells are connected with one another at a respective edge along at least one joining plane,
wherein each plastic shell has at least a first component and a second component formed from different plastics, wherein a plastic of the first component has a lower melting temperature than a plastic of the second component,
wherein the first component with the lower melting temperature extends on at least one plastic shell in a caterpillar-like manner along at least part of the respective edge of the second component of this plastic shell, and
wherein the at least one respective edge has a through-opening, and the first component is configured to deform through the at least one through-opening and solidify therein during welding of the two plastic shells.

* * * * *